United States Patent
Zhou et al.

(10) Patent No.: US 12,052,325 B1
(45) Date of Patent: Jul. 30, 2024

(54) SEGMENTING LARGE MESSAGE QUEUING TELEMETRY TRANSPORT (MQTT) MESSAGES IN A SERVICE PROVIDER NETWORK

(71) Applicant: Amazon Technologies, Inc., Seattle, WA (US)

(72) Inventors: Chao Zhou, Fremont, CA (US); Ravish Hastantram, Fremont, CA (US); Patrick Sisterhen, Georgetown, TX (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/372,313

(22) Filed: Sep. 25, 2023

(51) Int. Cl.
*H04L 67/12* (2022.01)
*H04L 67/55* (2022.01)
*H04L 67/562* (2022.01)

(52) U.S. Cl.
CPC .............. *H04L 67/55* (2022.05); *H04L 67/12* (2013.01); *H04L 67/562* (2022.05)

(58) Field of Classification Search
None
See application file for complete search history.

(56) References Cited

U.S. PATENT DOCUMENTS

| 9,210,534 | B1 * | 12/2015 | Matthieu | H04L 51/066 |
| 11,895,196 | B1 * | 2/2024 | Herrero | H04L 67/12 |
| 2020/0045547 | A1 * | 2/2020 | Singh Atwal | G06F 3/1238 |

* cited by examiner

*Primary Examiner* — Phuoc H Nguyen
*Assistant Examiner* — Steven C Nguyen
(74) *Attorney, Agent, or Firm* — Lee & Hayes, P.C.

(57) ABSTRACT

This disclosure describes a method for segmenting large MQTT messages that exceed a maximum transport unit (MTU) for MQTT messages into smaller segments and then reassembling the segments into the original MQTT message. More particularly, the techniques and architecture provide two new fields within an existing MQTT message. In configurations, the two new fields may include a universally unique identifier (UUID) and a segment number. These two new fields enable segmentation of arbitrarily large messages at a publisher side of the MQTT message and reassembly of the segments of the large messages at the subscriber side so that the message size limitation may be overcome. This can allow for larger MQTT messages to be transmitted without the increased cost of larger maximum transport units.

19 Claims, 11 Drawing Sheets

600 ↘

```
┌─────────────────────────────────────────────────────────────────────────┐
│ RECEIVE, AT A MESSAGE QUEUING TELEMETRY TRANSPORT (MQTT) BROKER FROM A  │
│ MESSAGE TRANSPORT CLIENT ON A FIRST INTERNET OF THINGS (IoT) DEVICE,    │
│ MULTIPLE SEGMENTS OF A MQTT MESSAGE, WHEREIN THE MULTIPLE SEGMENTS OF   │
│ THE MQTT MESSAGE COMPRISE A UNIVERSALLY UNIQUE IDENTIFIER (UUID) FIELD  │
│ AND A SEGMENT NUMBER FIELD INDICATING AT LEAST A TOTAL NUMBER OF        │
│ SEGMENTS OF THE MQTT MESSAGE                                            │
│                                  602                                    │
└─────────────────────────────────────────────────────────────────────────┘
                                    ↓
┌─────────────────────────────────────────────────────────────────────────┐
│ FORWARD, BY THE MQTT BROKER, THE MULTIPLE SEGMENTS TO ONE OF (I) A      │
│ MESSAGE TRANSPORT CLIENT AND A LIBRARY MESSAGE BROKER ON A SECOND IoT   │
│ DEVICE OR (II) AN EDGE MACHINE LEARNING (ML) MESSAGE BROKER SERVICE OF  │
│ A SERVICE PROVIDER NETWORK                                              │
│                                  604                                    │
└─────────────────────────────────────────────────────────────────────────┘
                                    ↓
┌─────────────────────────────────────────────────────────────────────────┐
│ UPON RECEIPT OF A FIRST SEGMENT OF THE MQTT MESSAGE, ACTIVATE, BY THE   │
│ ONE OF (I) THE MESSAGE TRANSPORT CLIENT AND THE LIBRARY MESSAGE BROKER  │
│ ON THE SECOND IoT DEVICE OR (II) THE EDGE ML MESSAGE BROKER SERVICE, A  │
│ TIMER ASSOCIATED WITH A LINKED LIST OF THE MULTIPLE SEGMENTS TO MONITOR │
│ A MAXIMUM WAITING TIME IN WHICH THE MULTIPLE SEGMENTS ARE TO BE         │
│ RECEIVED                                                                │
│                                  606                                    │
└─────────────────────────────────────────────────────────────────────────┘
                                    ↓
┌─────────────────────────────────────────────────────────────────────────┐
│ BASED AT LEAST IN PART ON THE SEGMENT NUMBER FIELD, DETERMINE, BY THE   │
│ ONE OF (I) THE MESSAGE TRANSPORT CLIENT AND THE LIBRARY MESSAGE BROKER  │
│ ON THE SECOND IoT DEVICE OR (II) THE EDGE ML MESSAGE BROKER SERVICE,    │
│ WHETHER ALL SEGMENTS OF THE MQTT MESSAGE HAVE BEEN RECEIVED             │
│                                  608                                    │
└─────────────────────────────────────────────────────────────────────────┘
                                    ↓
┌─────────────────────────────────────────────────────────────────────────┐
│ BASED AT LEAST IN PART ON DETERMINING THAT ALL OF THE SEGMENTS OF THE   │
│ MQTT MESSAGE HAVE BEEN RECEIVED, COMBINING, BY THE ONE OF (I) THE       │
│ MESSAGE TRANSPORT CLIENT AND THE LIBRARY MESSAGE BROKER ON THE SECOND   │
│ IoT DEVICE OR (II) THE EDGE ML MESSAGE BROKER SERVICE, THE MULTIPLE     │
│ SEGMENTS OF THE MQTT MESSAGE TO FORM THE MQTT MESSAGE, WHEREIN A SIZE   │
│ OF THE MQTT MESSAGE EXCEEDS A MAXIMUM TRANSPORT UNIT (MTU) OF AT LEAST  │
│ ONE OF (I) A NETWORK THAT INCLUDES THE MQTT BROKER, (II) THE FIRST IoT  │
│ DEVICE, OR (III) THE SECOND IoT DEVICE                                  │
│                                  610                                    │
└─────────────────────────────────────────────────────────────────────────┘
```

FIG. 6

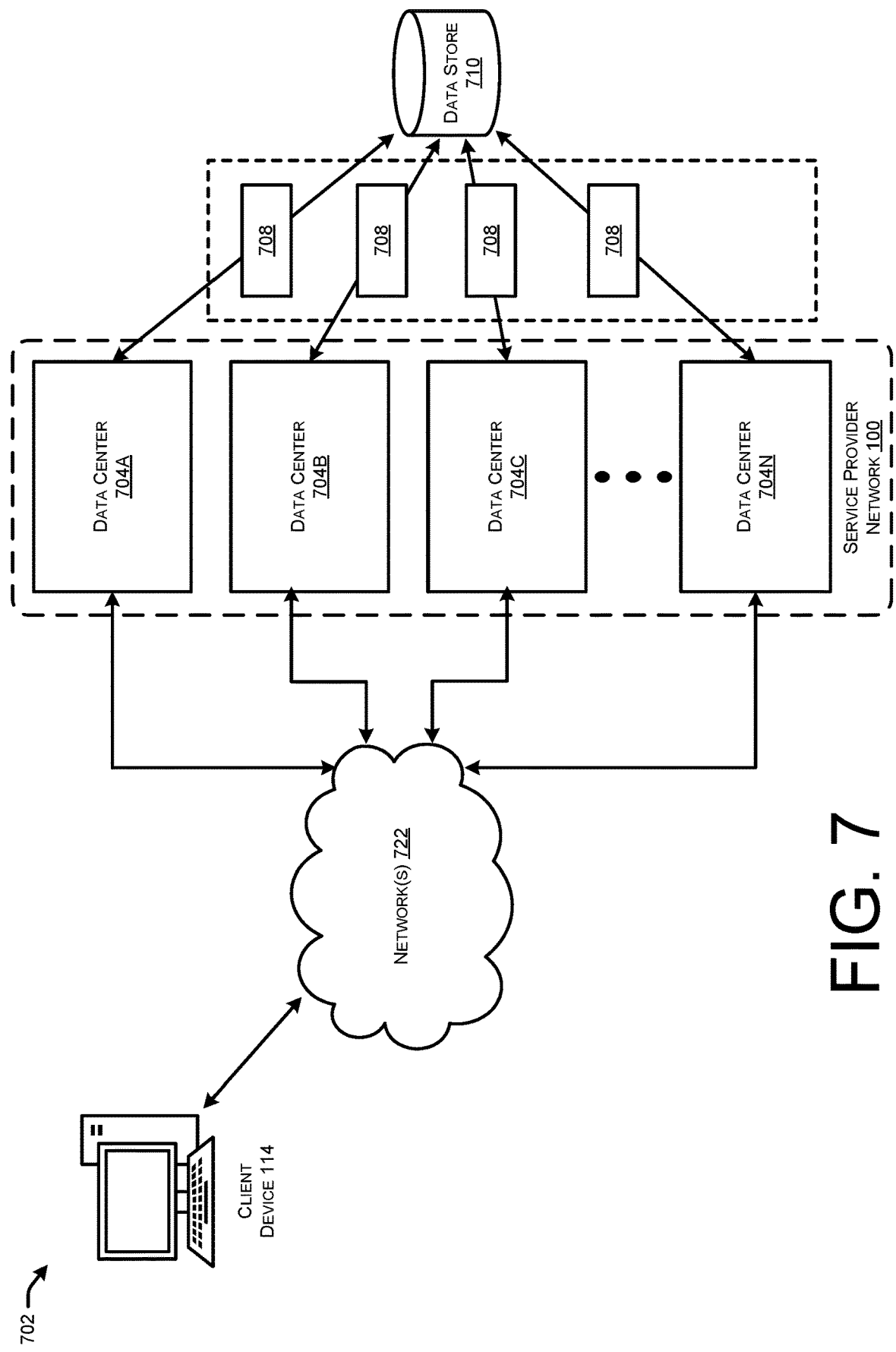

SEGMENTING LARGE MESSAGE QUEUING TELEMETRY TRANSPORT (MQTT) MESSAGES IN A SERVICE PROVIDER NETWORK

BACKGROUND

Service providers offer cloud-based services via service provider networks to fulfill user's computing service needs without the users having to invest in and maintain computing infrastructure required to implement the services. These service providers are generally in the form of on-demand computing platforms that may provide network-based computing resources and functionality to implement various types of cloud-based services, such as, for example, scalable-storage services, computer-processing services, and so forth. In some examples, developers may utilize services offered by the service provider to run the systems and/or applications using virtual services (or "instances") provisioned on various configurations of hardware-based resources of a cloud-based service.

An example of a service that may be provided by service provider networks includes a message queuing telemetry transport (MQTT) service. MQTT is a useful two-way messaging protocol and is generally used by billions of Internet of things (IoT) devices. Although the MQTT protocol supports messages with sizes up to 256 megabytes (MB), most MQTT implementations have a much lower size limit due to system constraints, scalability, and efficiency concerns. For example, a service provider network may have a 5 kilobyte (KB) limitation on a free tier of its MQTT service and a 128 KB maximum message size limitation, which is generally provided with an additional cost. Thus, for applications where MQTT seems especially suitable, this size limitation and increased cost severely limits the adoption and usage of MQTT.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 6 is a flow diagram of an example for segmenting large MQTT messages into smaller segments and then reassembling the segments into the original MQTT message in the example service provider network of FIG. 1.

FIG. 7 is a system and network diagram that shows an illustrative operating environment that includes a service provider network that can be configured to implement aspects of the functionality described herein.

DETAILED DESCRIPTION

Figure 1:
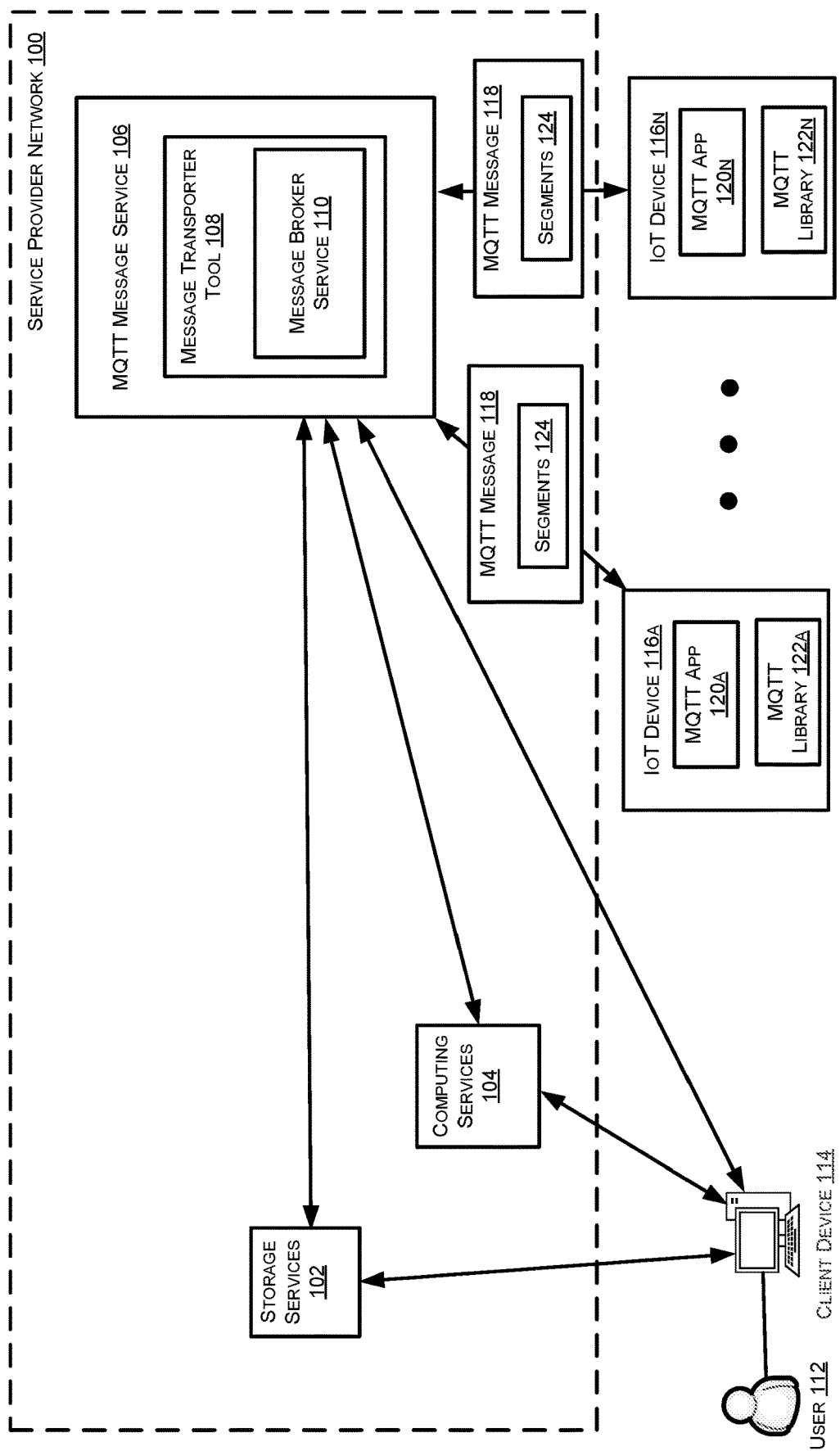
FIG. 1 schematically illustrates a system-architecture diagram of an example service provider network that includes a MQTT message service.

This disclosure describes, at least in part, techniques and architecture for segmenting large MQTT messages that exceed a maximum transport unit (MTU) for MQTT messages into smaller segments and then reassembling the segments into the original MQTT message. More particularly, the techniques and architecture provide two new fields within an existing MQTT message. In configurations, the two new fields may include a universally unique identifier (UUID) and a segment number. These two new fields enable segmentation of arbitrarily large messages at a publisher side of the MQTT message and reassembly of the segments of the large messages at the subscriber side so that the message size limitation may be overcome. In configurations, the two new fields may be located between the variable header field and the payload field in the known existing MQTT published message format according to the current MQTT protocol. The MQTT protocol MQTT is an OASIS standard. The specification is managed by the OASIS MQTT Technical Committee and the current MQTT protocol specification is "MQTT 5 Specification," which is available at https://mqtt.org/mqtt-specification/.

In configurations, the MQTT message UUID field and a segment number field are added after the variable header field in a MQTT PUBLISH message to enable the MQTT message to carry a message segment. The existence of these two new fields is indicated by a setting of the most significant bit of the last byte in the remaining length field of the MQTT message. In configurations, per the current MQTT protocol, the remaining length is encoded using a variable-length encoding scheme that uses one byte for values up to 127. The least seven important bits of each byte encodes the data, and the most important bit is used to indicate there are following bytes in the representation. Thus, in configurations, the most significant bit of the last byte in the remaining length field is used to indicate whether the message UUID field and the segment number field exist.

In configurations, the message UUID may be 6 to 28 bytes. In configurations, 1 byte may be used to indicate a length of the message UUID, 1 to 23 bytes may be used to represent a client identifier (ID), e.g., a particular IoT device publishing the MQTT message, and 3 to 8 bytes may be used for a message ID. As is known, when generated according to standard known methods, UUIDs are, for practical purposes, unique. Their uniqueness does not depend on a central registration authority or coordination between the parties generating them, unlike most other numbering schemes. While the probability that a UUID will be duplicated is not zero, it is generally considered close enough to zero to be negligible.

In configurations, the segment number is four bytes. The segment number may be in the form of a dividend over a divider. The divider may be the last two bytes and represents the total number of segments for the MQTT message. The dividend may be the first two bytes and represents the message segment's index in the whole message. For example, 0/3 represents the first segment of a MQTT message that has three total segments. A two-byte index provides 64,000 segments. With a maximum transport unit (MTU) of 128 KB, this allows messages of up to 8 GB to be sent through a network using MQTT.

In configurations, the dividend and divider may also be used to correlate with the message UUID when the segments are reassembled on the subscriber side. The last four bytes of the message UUID may provide the message ID associated with a specific client ID, e.g., a particular IoT device. As previously noted, in configurations the message ID may be four bytes, which, in combination with the client ID of 1 to 23 bytes, allows for 4 billion unique message UUIDs so the chance of collision is low, e.g., duplicate UUIDs.

Thus, on the publisher side of the MQTT message, in configurations, a large MQTT message may be broken down into segments by a publishing client, e.g., a publishing IoT device, with each segment encapsulated into a MQTT PUBLISH message and published to the MQTT broker/server. The MQTT broker/server may be provided by a service provider network, e.g., implemented in the cloud, or may be a server in some other type of network. For example, a large MQTT message having a size of 12 KB may need to be published by a first IoT device via a network having a MTU of 5 KB. Thus, the original MQTT message may be broken into 3 segments of 5 KB, 5 KB, and 2 KB. Alternatively, in configurations, the original MQTT message may be broken into three equal segments of 4 KB. Each message segment may then be published by the first IoT device to the MQTT broker/server, which may then provide each segment to a second IoT device (or more IoT devices) on a subscriber side. The second IoT device may then reassemble the MQTT message segments into the complete, original MQTT message.

More particularly, on the subscriber side, when a message is received, the segments are reassembled based on their segment number. With the first segment received, the subscriber will put it into a buffer that can be identified with the message identifier retrieved from the message UUID. Thus, continuing with the previous example of 12 KB MQTT message and a MTU of 5 KB, the total field (divider) of the segment number field is 3. The first segment of the MQTT message has an index of 0 (0/3 index/total), the second segment of the MQTT message has an index of 1 (1/3 index/total), and the third segment of the MQTT message has an index of 2 (2/3 index/total). A special case such as 0/1 index/total means there is only one segment in the complete MQTT message.

In configurations, a timer associated with the linked list of segments may be started. If all segments are not received within a maximum waiting time, the whole linked list may be discarded or freed. Within the maximum waiting time, all received segments within a range of message UUIDs of the linked list of segments are inserted into the linked list in the order according to their segment number.

Once the second IoT device starts receiving segments of the MQTT message, there are various ways to maintain the segments and the reassembled messages. For example, pre-reserved buffers may be used. Once a segment is received, a buffer with the length of the whole message may be reserved and the received segment may be copied to that buffer based on its index. Subsequently received segments follow the same method and may be placed in their places in the buffer. This method uses less processing, but the system has to pre-reserve buffers that might not even be used later, e.g., not all segments of the MQTT message may be received. Another example uses incrementally reserved buffers, i.e., buffers for the segments may be reserved only when a segment is received, for example, in the form of a node in a linked list. Only when all segments are received is an entire buffer reserved and the segments are copied over to the buffer. This saves the system from pre-reserving memory that is not used immediately, but extra processing is needed for the handling of the segments.

Thus, as an example, a method may include, receiving, at a message queuing telemetry transport (MQTT) broker from a message transport client on a first Internet of Things (IoT) device, multiple segments of a MQTT message, wherein the multiple segments of the MQTT message comprise a universally unique identifier (UUID) field and a segment number field indicating at least a total number of segments of the MQTT message. The method may also include sending, by the MQTT broker, the multiple segments to one of (i) a message transport client and a library message broker on a second IoT device or (ii) an edge machine learning (ML) message broker service of a service provider network. The method may further include based at least in part on the segment number field, determining, by the one of (i) the message transport client and the library message broker on the second IoT device or (ii) the edge ML message broker service, whether all segments of the MQTT message have been received. The method may additionally include based at least in part on determining that all of the segments of the MQTT message have been received, combining, by the one of (i) the message transport client and the library message broker on the second IoT device or (ii) the edge ML message broker service, the multiple segments of the MQTT message to form the MQTT message, wherein a size of the MQTT message exceeds a maximum transport unit (MTU) of at least one of (i) a network that includes the MQTT broker, (ii) the first IoT device, or (iii) the second IoT device.

In configurations, the UUID may comprise a length field, a client identifier field, and a message ID field.

In configurations, the segment number field may comprise (i) a total field indicating a total number of segments of the MQTT message and (ii) an index indicating a corresponding number of a corresponding segment out of the total number of segments of the MQTT message.

In configurations, the method may further include upon receipt of a first segment of the multiple segments of the MQTT message at the one of (i) the message transport client and the library message broker on the second IoT device or (ii) the edge ML message broker service, storing the first segment of the MQTT message in a first buffer. In such configurations, the method may also include upon receipt of a second segment of the multiple segments of the MQTT message at the one of (i) the message transport client and the library message broker on the second IoT device or (ii) the edge ML message broker service, storing the second segment of the MQTT message in a second buffer.

In configurations, the first buffer and the second buffer are pre-reserved as a single buffer having a second size equal to the size of the MQTT message.

In configurations, the method may further include copying, by the one of (i) the message transport client and the library message broker on the second IoT device or (ii) the edge ML message broker service, the first segment of the MQTT message from the first buffer and the second segment of the MQTT message from the second buffer into a single buffer having a second size equal to the size of the MQTT message.

In configurations, a most significant bit of a last byte in a remaining length field of the first segment of the MQTT message and the second segment of the MQTT message indicates a presence of the UUID field and the segment number field.

In configurations, the method may further include upon receipt of the first segment of the MQTT message, activating, by the one of (i) the message transport client and the library message broker on the second IoT device or (ii) the edge ML message broker service, a timer to monitor a maximum waiting period associated with a linked list of the multiple segments and in which the multiple segments are to be received. In such configurations, the method may also include upon expiration of the maximum waiting period, performing the determining, by the one of (i) the message transport client and the library message broker on the second IoT device or (ii) the edge ML message broker service, if all segments of the MQTT message have been received. In such configurations, the method may additionally include based at least in part on determining that all of the segments of the MQTT message have not been received, discarding, by the one of (i) the message transport client and the library message broker on the second IoT device or (ii) the edge ML message broker service, the multiple segments of the MQTT message to form the MQTT message.

Thus, the techniques and architecture described herein provide a method for segmenting large MQTT messages that exceed a maximum transport unit (MTU) for MQTT messages into smaller segments and then reassembling the segments into the original MQTT message. More particularly, the techniques and architecture provide two new fields within an existing MQTT message. In configurations, the two new fields may include a universally unique identifier (UUID) and a segment number. These two new fields enable segmentation of arbitrarily large messages at a publisher side of the MQTT message and reassembly of the segments of the large messages at the subscriber side so that the message size limitation may be overcome. This can allow for larger MQTT messages to be transmitted without the increased cost of larger maximum transport units. Additionally, latency may be improved since large messages that exceed the MTU will not be dropped.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 schematically illustrates a system-architecture diagram of an example service provider network 100. The service provider network 100 may comprise servers (not illustrated) that do not require end-user knowledge of the physical location and configuration of the system that delivers the services. Common expressions associated with the service provider network may include, for example, "on-demand computing," "software as a service (SaaS)," "cloud services," "data centers," and so forth. Services provided by the service provider network 100 may be distributed across one or more physical or virtual devices.

As may be seen in FIG. 1, the service provider network 100 includes storage services 102 and computing services 104 that are provided by the service provider network 100. As is known, in configurations, other types of services may also be provided by the service provider network 100. The storage services 102 and computing services 104, as well as any other services, may be provided to businesses or individuals.

In configurations, the service provider network 100 includes MQTT message service 106. The MQTT message service 106 includes a message transporter tool 108 and message broker service 110. In configurations, the MQTT message service 106 may communicate with the storage services 102 and/or the computing services 104.

In configurations, a user 112 accesses the service provider network 100 using a client device 114. The user 112 may thus obtain computing services 102 and storage services 104, as well as other services, from the service provider network 100, using the client device 114. IoT devices 116a, . . . , 116n may publish (transmit) and subscribe to (receive) MQTT messages 118 via the MQTT service 106. In configurations, the client device 114 may be a IoT device and may thus also publish and subscribe to MQTT messages 118 via the MQTT service 106. The IoT devices 116a, . . . , 116n each include a corresponding MQTT app 120 and/or MQTT library 122 so that the IoT devices 116a, . . . , 116n may use MQTT techniques and the MQTT service 106. The MQTT app 120 and/or the MQTT library 122 may include various scripts, code, firmware, etc. to allow the IoT devices 116a, . . . , 116n to interact with the MMQT message service 106 in accordance with the MQTT protocol. While the techniques and architecture described herein are with respect to MQTT service 106 of the service provider network 100, it should be understood that the techniques and architecture are equally applicable to other types of MQTT arrangements and implementations. The MQTT app 120 and/or the MQTT library 122 may thus include various scripts, code, firmware, etc., to allow the IoT devices 116a, . . . , 116n to interact with other types of MQTT arrangements and implementations in accordance with the MQTT protocol.

As previously noted, the MQTT protocol MQTT is an OASIS standard. The specification is managed by the OASIS MQTT Technical Committee and the current MQTT protocol specification is "MQTT 5 Specification," which is available at https://mqtt.org/mqtt-specification/. Briefly, as is known, MQTT is a lightweight, publish-subscribe, machine to machine network protocol for message queue/message queuing service. It is designed for connections with remote locations that have devices with resource constraints or limited network bandwidth, such as IoT devices. The MQTT protocol defines two types of network entities: a message broker, e.g., message broker service 110, and a number of clients, e.g., IoT devices 116a, . . . , 116n. An MQTT broker is a server that receives all messages from the clients and then routes or forwards the messages to the appropriate destination clients. An MQTT client is any device (from a micro controller up to a fully-fledged server) that runs an MQTT library and connects to an MQTT broker over a network.

With MQTT, information is organized in a hierarchy of topics. When a publisher has a new item of data to distribute, it sends a control message with the data to the connected broker. The broker then distributes or forwards the information to any clients that have subscribed to that topic. The publisher does not need to have any data on the number or locations of subscribers, and subscribers, in turn, do not have to be configured with any data about the publishers.

If a broker receives a message on a topic for which there are no current subscribers, the broker discards the message unless the publisher of the message designated the message as a retained message. A retained message is a normal MQTT message with the retained flag set to true. The broker stores the last retained message and the corresponding quality of service (QoS) for the selected topic. Each client that subscribes to a topic pattern that matches the topic of the retained message receives the retained message immediately after they subscribe. The broker stores only one retained message per topic. This allows new subscribers to a topic to receive the most current value rather than waiting for the next update from a publisher.

When a publishing client first connects to the broker, it can set up a default message to be sent to subscribers if the broker detects that the publishing client has unexpectedly disconnected from the broker. Clients only interact with a broker, but a system may contain several broker servers that exchange data based on their current subscribers' topics.

A minimal MQTT control message can be as little as two bytes of data. A control message can carry nearly 256 megabytes of data if needed. There are fourteen defined message types used to connect and disconnect a client from a broker, to publish data, to acknowledge receipt of data, and to supervise the connection between client and server.

As will be described further, in accordance with techniques described herein, large MQTT messages 118 may be segmented into smaller segments 124 and then reassembled into the original MQTT message 118. More particularly, the techniques provide two new fields within an existing MQTT message 118. In configurations, the two new fields may include a universally unique identifier (UUID) and a segment number. These two new fields enable segmentation of arbitrarily large messages at a publisher side of the MQTT message and reassembly of the segments of the large messages at the subscriber side so that the message size limitation may be overcome. In configurations, the two new fields may be located between the variable header field and the payload field in the known existing MQTT published message format according to the current MQTT protocol.

Figure 2:
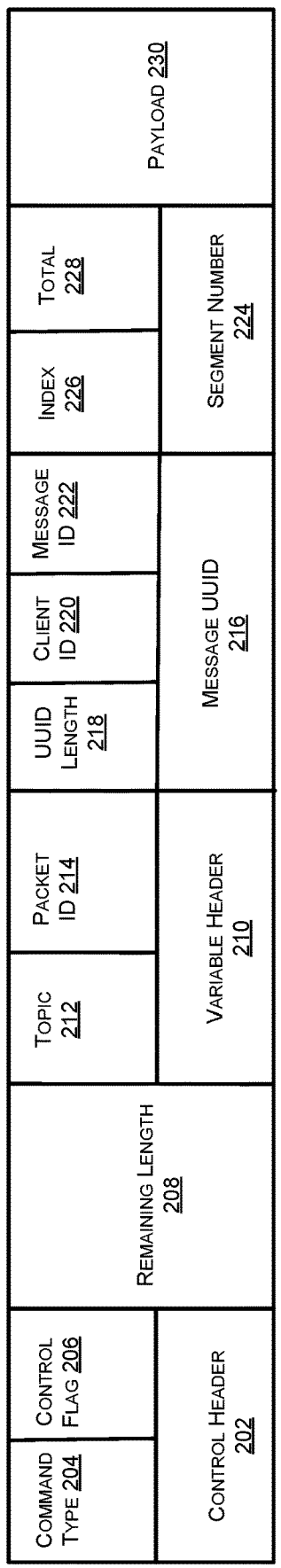
FIG. 2 schematically illustrates an example of a MQTT message that includes the two additional fields in accordance with techniques described herein in the example service provider network of FIG. 1.

FIG. 2 schematically illustrates an example of a MQTT message 200, e.g., MQTT message 118, that includes the two new fields in accordance with techniques described herein. The MQTT message 200 includes a control header 202 field that includes a command type 204 and a control flag 206. The MQTT message 200 also includes a remaining length 208 field and a variable header 210 field. The variable header 210 includes a topic 212 and a packet ID 214. The MQTT message 200 further includes a message UUID 216 field that includes a UUID length 218, a client ID 220, and a message ID 222. The MQTT message 200 also includes a segment number 224 field that includes an index 226 and a total 228. The MQTT message 200 also includes a payload 230 of the MQTT message 200.

The command type 204 of the control header 202 represents the control packet type of the MQTT message 200. In accordance with MQTT protocol, there are 15 different MQTT packet types. The control flag 206 is fixed corresponding to the used MQTT message type and cannot be changed by the client (e.g., IoT devices 116a, . . . , 116n), with one exception, the PUBLISH control packet type.

The remaining length 208 denotes the remaining length of the variable header 210 and payload data, e.g., payload 230. For small packets less than 127 bytes, the remaining length is stored in one byte and the 8th bit is a continuation bit. For packets larger than 127 bytes and smaller than 16383 bytes, 2 bytes are used. In accordance with the current MQTT protocol, the maximum size of the MQTT message 200 is 256 MB.

The variable header 210 includes a topic 212 that is generally a Unicode transformation format (UTF)-encoded string. Any IoT devices 116a, . . . , 116n that subscribe to a particular topic will receive the MQTT message 200 if the topic 212 matches the particular topic. The Message ID 214 field is only present in messages where the QoS bits in the control header 202 indicate QoS levels 1 or 2.

The payload 230 holds the data related to the packet being sent. For a PUBLISH MQTT message 200, this is the actual message being sent. The MQTT message 200 can be in any format, but most often in ASCII-encoded characters formatted as JSON, XML, or text.

As can be seen in FIG. 2, in configurations, the message UUID 216 field and the segment number 224 field are added after the variable header 210 field in the example MQTT message 200 to enable the MQTT message 200 to carry a message segment. The existence of these two new fields is indicated by a setting of the most significant bit of the last byte in the remaining length 208 field of the MQTT message 200. In configurations, per the current MQTT protocol, the remaining length 208 is encoded using a variable-length encoding scheme that uses one byte for values up to 127. The least seven important bits of each byte encodes the data, and the most important bit is used to indicate there are following bytes in the representation. Thus, in configurations, the most significant bit of the last byte in the remaining length 208 field is used to indicate whether the message UUID 216 field and the segment number 224 field exist.

In configurations, the message UUID 216 may be 6 to 28 bytes. In configurations, 1 byte may be used to indicate the length 218 of the message UUID 216, 1 to 23 bytes may be used to represent a client identifier (ID), e.g., a particular IoT device publishing the MQTT message, and 3 to 8 bytes may be used for a message ID. As is known, when generated according to standard known methods, UUIDs are, for practical purposes, unique. Their uniqueness does not depend on a central registration authority or coordination between the parties generating them, unlike most other numbering schemes. While the probability that a UUID will be duplicated is not zero, it is generally considered close enough to zero to be negligible.

In configurations, the segment number 224 is four bytes. The segment number 224 may be in the form of a dividend over a divider. The divider may be the last two bytes and represents the total 228 number of segments for the MQTT message 200. The dividend may be the first two bytes and represents the message segment's index 226 in the whole MQTT message 200. For example, 0/3 represents the first segment of a MQTT message 200 that has three total segments. A two-byte index provides 64,000 segments. With a maximum transport unit (MTU) of 128 KB, this allows messages of up to 8 GB to be sent through a network using MQTT.

In configurations, the dividend and divider may also be used to correlate with the message UUID 216 when the segments are reassembled on the subscriber side. The last four bytes of the message UUID 216 may provide the message ID 222 associated with a specific client ID 220, e.g., a particular IoT device 116a, . . . , 116n. As previously noted, in configurations the message ID 222 may be four bytes, which, in combination with the client ID of 1 to 23 bytes, allows for 4 billion unique message UUIDs so the chance of collision is low, e.g., duplicate UUIDs.

Figure 3A:
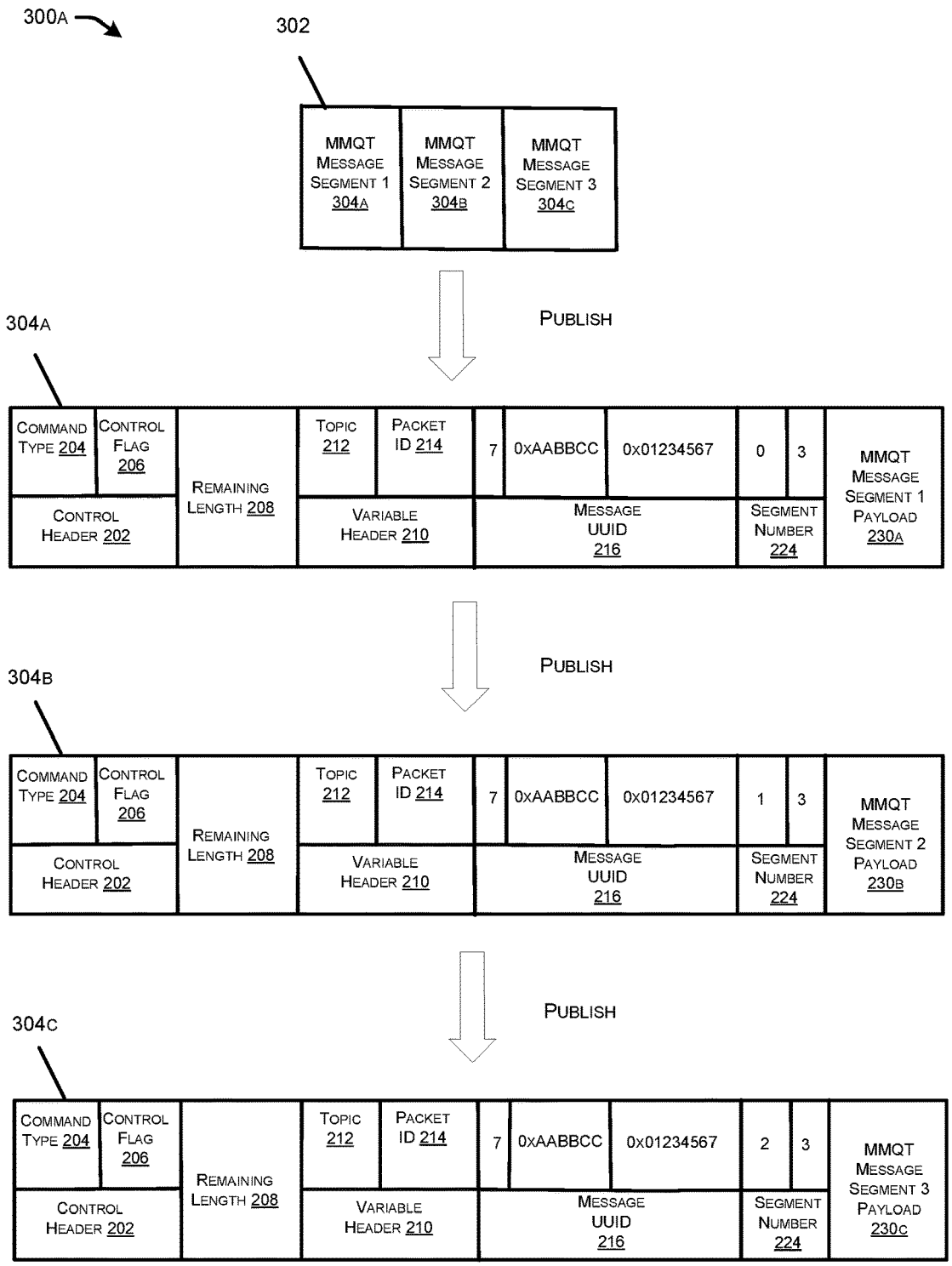
FIGS. 3A and 3B schematically illustrate example flows of segmenting a large MQTT message larger than transport MTU into MQTT message segments on a publisher's side and a subscriber's side of an MQTT message service in the example service provider network of FIG. 1.

FIG. 3A schematically illustrates a flow 300a of MQTT message segments on a publisher's side of an MQTT message service, e.g., MQTT message service 106. A large MQTT message 302 is broken down into segments 304a, 304b, and 304c, with each segment 304a, 304b, and 304c may be encapsulated into its own MQTT published message and published to a MQTT broker/server, e.g., MQTT message broker service 110, in accordance with the MQTT protocol. In configurations, each segment 304a, 304b, and 304c may be encapsulated into its own MQTT published message has its own message UUID 216 to uniquely identify each segment as an encapsulated MQTT message. For example, the large MQTT message 302 that is larger than the maximum transmit unit (MTU) for the MQTT message service is broken into, for example, the three segments 304a, 304b, and 304c. For example, in configurations, if the MTU is 5 KB and the large MQTT message 302 is 12 KB, then the message may be broken into 3 segments, where the first 2 segments 304a and 304b are 5 KB and the third segment 304c is 2 KB. In configurations, the large MQTT message 302 may be broken into 3 segments each equal to 4 KB.

Figure 3B:
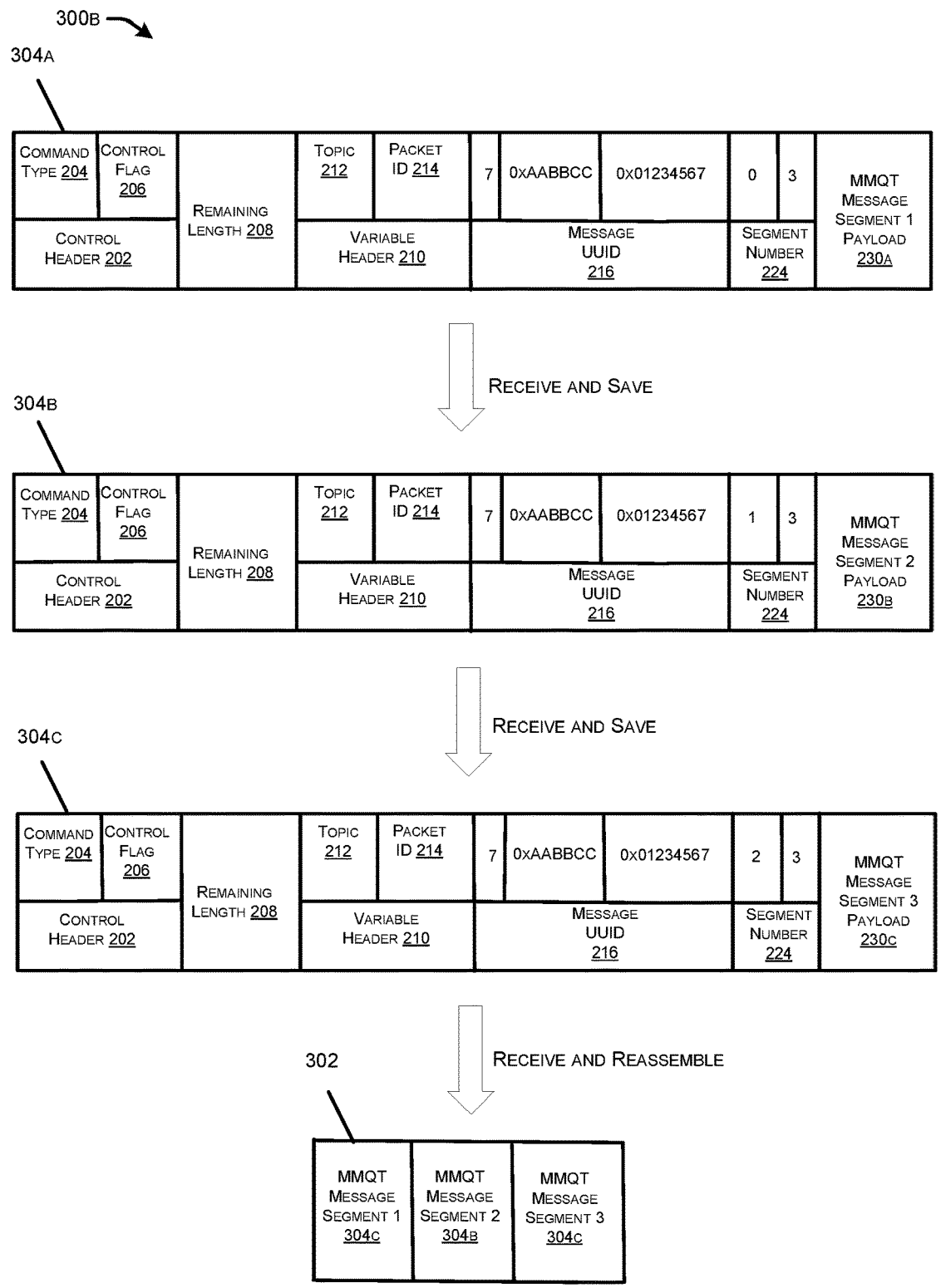

In the example of FIGS. 3A and 3B, segment 304a has a message UUID 216 of 7/0xAABBCC/0x01234567 (UUID length 218 is 7 bytes, client ID 220 is 0xAABBCC and message ID 222 is 0x01234567). Segment 304b includes the message UUID 216 of 7/0xAABBCC/0x01234567 (UUID length 218 is 7, client ID 220 is 0xAABBCC and message ID 222 is 0x01234567). Segment 304a also includes the message UUID 216 of 7/0xAABBCC/0x01234567 (UUID length 218 is 7, client ID 220 is 0xAABBCC and message ID 222 is 0x01234567). Additionally, segment 304a includes MMQT message segment payload 230a, segment 304b includes MMQT message segment payload 230b, and segment 304c includes MMQT message segment payload 230c.

The first segment 304a of the large MQTT message 302 is then provided to the MQTT broker/server, which publishes it. Likewise, the second segment 306 and the third segment 308 are sent to the MQTT broker/server, which publishes them.

FIG. 3B schematically illustrates a flow 300b of MQTT message segments on a subscriber's side of an MQTT message service, e.g., MQTT message service 106. When a message segment is received by a second IoT device, e.g., an IoT device 116, the segments 304a, 304b, 304c may be reassembled based on their segment number 224. As noted, each segment 304a, 304b, and 304c may be encapsulated into its own MQTT published message and published to a MQTT broker/server, e.g., MQTT message broker service 110, in accordance with the MQTT protocol. The first segment 304a of the large MQTT message 302 is then provided to the MQTT broker/server, which publishes it to a IoT device, e.g., an IoT device 116. Likewise, the second segment 306 and the third segment 308 are sent to the MQTT broker/server, which publishes them, which publishes it to a IoT device, e.g., the IoT device 116. The IoT device may then reassemble the segments 304a, 304b, and 304c into the large MQTT message 302.

Once the second IoT device starts receiving segments of the MQTT message 302, there are various ways to maintain the segments 304a, 304b, and 304c and the reassembled message 302. For example, pre-reserved buffers may be used. Once a segment 304a, 304b, and 304c is received, a buffer with the length of the whole message 302 may be reserved and the received segment may be copied to that buffer based on its index 226. Subsequently received segments follow the same method and may be placed in their places in the buffer. This method uses less processing, but the system has to pre-reserve buffers that might not even be used later, e.g., not all segments of the MQTT message 302 may be received. Another example uses incrementally reserved buffers, i.e., buffers for the segments 304a, 304b, and 304c may be reserved only when a segment is received, for example, in the form of a node in a linked list. Only when all segments 304a, 304b, and 304c are received is an entire buffer reserved and the segments 304a, 304b, and 304c are copied over to the buffer as the entire, reassembled message 302. This saves the system from pre-reserving memory that is not used immediately, but extra processing is needed for the handling of the segments 304a, 304b, and 304c.

In configurations, a timer associated with the linked list of segments 304a, 304b, and 304c may be started once the segments begin being received. If all segments are not received within a maximum waiting time, the whole linked list may be discarded or freed. Within the maximum waiting time, all received segments within a range of message UUIDs of the linked list of segments are inserted into the linked list in the order according to their segment number.

Figure 4:
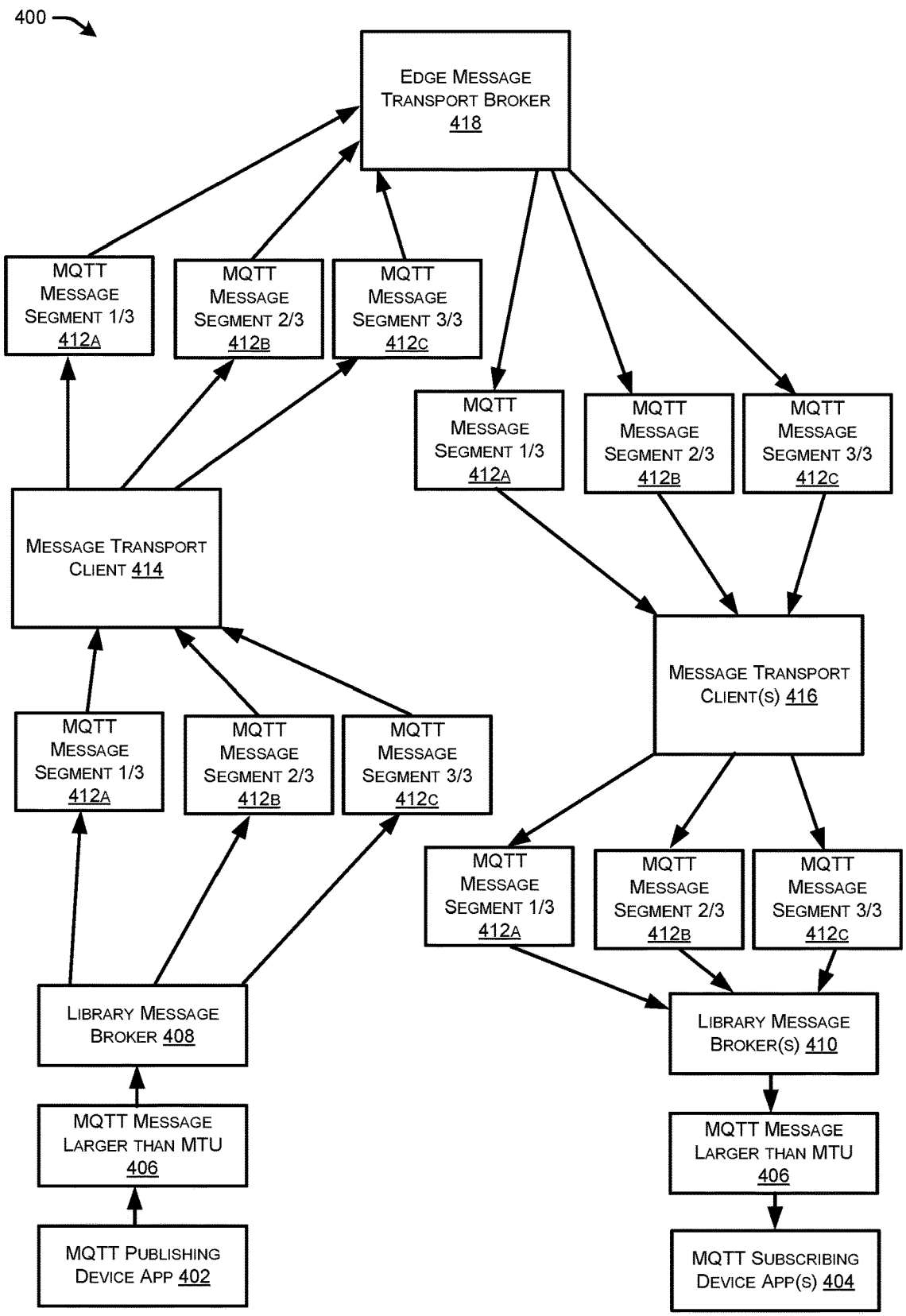
FIG. 4 schematically illustrates a process of a MQTT publishing device app on an IoT device publishing a large MQTT message larger than transport MTU as segments and a subscribing app on a second IoT device receiving the segments as the message larger than transport MTU in the example service provider network of FIG. 1.

FIG. 4 schematically illustrates a process 400 of a MQTT publishing device app 402, e.g., a MQTT app 120, on an IoT device, e.g., an IoT device 116 publishing a message larger than a transport MTU as segments and a subscribing app on a second IoT device receiving the segments as the message larger than a transport MTU. The MQTT publishing device app 402 may provide a message 406 that is larger than the transport MTU. The message 406 may be provided to a library message broker 408 on the IoT device. The library message broker 408 is generally a library, e.g., a library 122, located on the IoT device. The library message broker 408 may break the message into three segments 412a, 412b, and 412c. The three segments 412a, 412b, and 412c may then be provided to a message transport client 414, which is also a library on the IoT device. In configurations, the message transport client 414 and the library message broker 408 may be part of the same library and/or may be included on the MQTT publishing device app 402.

The message transport client 414 may then route the three segments 412a, 412b, and 412c to an edge message transport broker 418, which may be located in the cloud, e.g., at the MQTT message service 106 of the service provider network 100. The message transport client 414 is configured to communicate with the message transport broker 418 in accordance with the MQTT protocol. In configurations, the edge message transport broker 418 may be located on a local web server.

The edge message transport broker 418 may then publish the three segments 412a, 412b, and 412c to one or more message transport client(s) 416 located on one or more corresponding subscribing IoT device(s), e.g., IOT devices 116. The message transport client(s) 416 may then be used to communicate with the library message broker(s) 410 on the corresponding subscribing IoT device(s) and provide the three segments 412a, 412b, and 412c to the library message broker(s) 410. The library message broker(s) 410 may then assemble the three segments 412a, 412b, and 412c into the message 406 that is larger than the transport MTU, which is provided to corresponding one or more subscribing device app(s) 404 located on the one or more IoT devices, e.g., IoT devices 116. As previously noted, the corresponding message transport client(s) 416 and the corresponding library message broker(s) 410 may be part of the same library on one or more of the subscribing IoT devices and/or may be part of the corresponding subscribing device app(s) 404 on one or more IoT devices.

Figure 5:
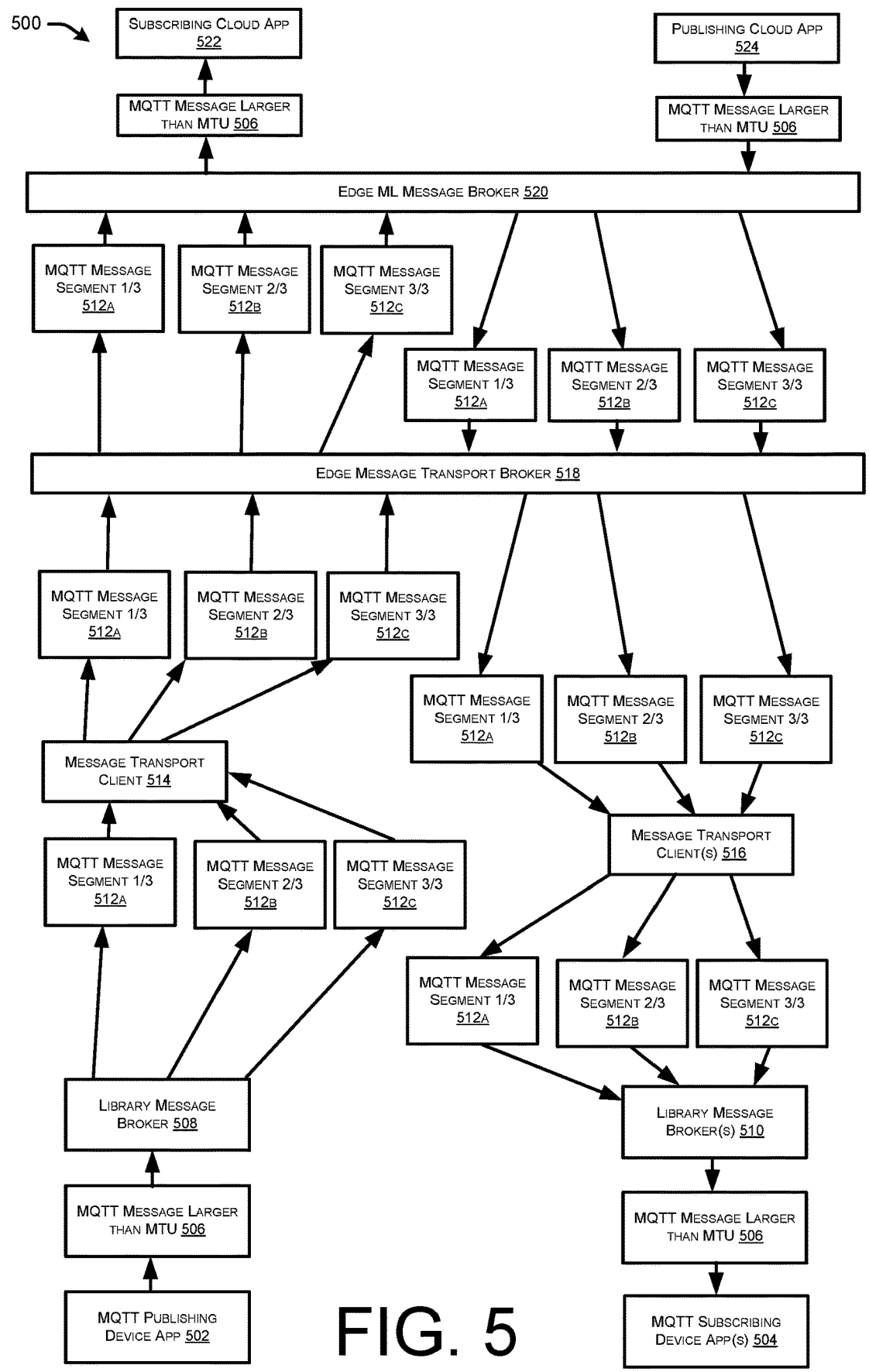
FIG. 5 schematically illustrates a flow for handling of MQTT messages larger than transport MTUs when a subscribing app and/or a publishing app may be located in the cloud.

FIG. 5 schematically illustrates a flow 500 for handling of MQTT messages larger than transport MTUs when a subscribing app and/or a publishing app may be located in the cloud. A MQTT publishing device app 502, e.g., a MQTT app 120, on an IoT device, e.g., an IoT device 116 may provide a message 506 that is larger than the transport MTU. The message 506 may be provided to a library message broker 508 on the IoT device. The library message broker 508 is generally a library, e.g., a library 122, located on the IoT device. The library message broker 508 may break the message into three segments 512a, 512b, and 512c. The three segments 512a, 512b, and 512c may then be provided to a message transport client 514, which is also a library on the IoT device. In configurations, the message transport client 514 and the library message broker 508 may be part of the same library and/or may be included on the MQTT publishing device app 502.

The message transport client 514 may then route the three segments 512a, 512b, and 512c to an edge message transport broker 518, which may be located in the cloud, e.g., at the MQTT message service 106 of the service provider network 100. The message transport client 514 is configured to communicate with the edge message transport broker 518 in accordance with the MQTT protocol. In configurations, the edge message transport broker 518 may be located on a local web server.

In configurations, the message transport broker may provide the three message segments to an edge machine learning (ML) message broker service 520 located within the cloud, e.g., the MQTT message service 106 of a service provider network 100. The edge ML message broker service 520 may then assemble the three segments into the message 506 that is larger than the transport MTU and provide the message 506 to a subscribing cloud app 522 that is located within the cloud, e.g., the service provider network 100.

Likewise, a publishing cloud app 524 may provide the message 506 larger than the transport MTU to the edge ML message broker service 520. The edge ML message broker service 520 may break the message into three segments 512a, 512b, and 512c and provide the segments 512a, 512b, and 512c to the edge message transport broker 518.

The edge message transport broker 518 may then publish the three message segments 512a, 512b, and 512c to one or more message transport client(s) 516 located on one or more corresponding subscribing IoT device(s), e.g., IOT devices 116. The message transport client(s) 516 may then be used to communicate with the library message broker(s) 510 on the corresponding subscribing IoT device(s) and provide the three segments 512a, 512b, and 512c to the library message broker(s) 510. The library message broker(s) 510 may then assemble the three segments 512a, 512b, and 512c into the message 506 that is larger than the transport MTU, which is provided to corresponding one or more subscribing device app(s) 504 located on the one or more IoT devices, e.g., IoT devices 116. As previously noted, the corresponding message transport client(s) 516 and the corresponding library message broker(s) 510 may be part of the same library on one or more of the subscribing IoT devices and/or may be part of the corresponding subscribing device app(s) 504 on one or more IoT devices.

While the previous examples have been described using MQTT messages broken into three segments, more or fewer segments may be used depending on the MTU. For example, a two-byte index 226 provides 64,000 segments. With a maximum transport unit (MTU) of 128 KB, this allows messages of up to 8 GB to be sent through a network using MQTT.

FIG. 6 illustrates an example flow diagram of example method 600 that illustrates aspects of the functions performed at least partly by the services as described in FIGS. 1-5. The logical operations described herein with respect to FIG. 6 may be implemented (1) as a sequence of computer-implemented acts or program modules running on a computing system, and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIG. 6 and described herein. These operations can also be performed in parallel, or in a different order than those described herein. Some or all of these operations can also be performed by components other than those specifically identified. Although the techniques described in this disclosure are with reference to specific components, in other examples, the techniques may be implemented by less components, more components, different components, or any configuration of components.

FIG. 6 illustrates a flow diagram of the example method 600 for segmenting large MQTT messages into smaller segments and then reassembling the segments into the original MQTT message. At 602, a message queuing telemetry transport (MQTT) broker receives multiple segments of a MQTT message from a message transport client on a first Internet of Things (IoT) device, wherein the multiple segments of the MQTT message comprise a universally unique identifier (UUID) field and a segment number field indicating at least a total number of segments of the MQTT message. For example, a MQTT message 200 includes a message UUID 216 field that includes a UUID length 218, a client ID 220, and a message ID 222. The MQTT message 200 also includes a segment number 224 field that includes an index 226 and a total 228.

In configurations, 1 byte may be used to indicate the length 218 of the message UUID 216, 1 to 23 bytes may be used to represent a client identifier (ID), e.g., a particular IoT device publishing the MQTT message, and 3 to 8 bytes may be used for a message ID. As is known, when generated according to standard known methods, UUIDs are, for practical purposes, unique. Their uniqueness does not depend on a central registration authority or coordination between the parties generating them, unlike most other numbering schemes. While the probability that a UUID will be duplicated is not zero, it is generally considered close enough to zero to be negligible.

In configurations, the segment number 224 is four bytes. The segment number 224 may be in the form of a dividend over a divider. The divider may be the last two bytes and represents the total 228 number of segments for the MQTT message 200. The dividend may be the first two bytes and represents the message segment's index 226 in the whole MQTT message 200. For example, 0/3 represents the first segment of a MQTT message 200 that has three total segments. A two-byte index provides 64,000 segments. With a maximum transport unit (MTU) of 128 KB, this allows messages of up to 8 GB to be sent through a network using MQTT.

A MQTT publishing device app 402, 502 may provide a message 406, 506 that is larger than the transport MTU. The message 406, 506 may be provided to a library message broker 408, 508 on the IoT device. The library message broker 408, 508 is generally a library, e.g., a library 122, located on the IoT device. The library message broker 408, 508 may break the message into three segments 412a, 412b, and 412c, or 512a, 512b, and 512c. The three segments 412a, 412b, and 412c, or 512a, 512b, and 512b may then be provided to a message transport client 414, 514, which is also a library on the IoT device. In configurations, the message transport client 414, 514 and the library message broker 408, 508 may be part of the same library and/or may be included on the MQTT publishing device app 402.

At 604, the MQTT broker sends the multiple segments to one of (i) a message transport client and a library message broker on a second IoT device or (ii) an edge machine learning (ML) message broker service of a service provider network. For example, the message transport client 414 may then route the three segments 412a, 412b, and 412c, or 512a, 512b, and 512c to an edge message transport broker 418, 518 which may be located in the cloud, e.g., at the MQTT message service 106 of the service provider network 100. The message transport client 414, 514 is configured to communicate with the message transport broker 418, 518 in accordance with the MQTT protocol. In configurations, the edge message transport broker 418, 518 may be located on a local web server.

At 606, upon receipt of a first segment of the multiple segments of the MQTT message the one of (i) the message transport client and the library message broker on the second IoT device or (ii) the edge ML message broker service activates a timer associated with a linked list of the multiple segments to monitor a maximum waiting time in which the multiple segments are to be received. At 608, based at least in part on the segment number field, the one of (i) the message transport client and the library message broker on the second IoT device or (ii) the edge ML message broker service determines whether all segments of the MQTT message have been received. For example, in configurations, a timer associated with the linked list of segments may be started. If all segments are not received within a maximum waiting time, the whole linked list may be discarded or freed. Within the maximum waiting time, all received segments within a range of message UUIDs 216 are inserted into the linked list in the order according to their segment number.

At 610, based at least in part on determining that all of the segments of the MQTT message have been received, the one of (i) the message transport client and the library message broker on the second IoT device or (ii) the edge ML message broker service combines the multiple segments of the MQTT message to form the MQTT message, wherein a size of the MQTT message exceeds a maximum transport unit (MTU) of at least one of (i) a network that includes the MQTT broker, (ii) the first IoT device, or (iii) the second IoT device. For example, the edge message transport broker 418 may then publish the three segments 412a, 412b, and 412c to one or more message transport client(s) 416 located on one or more corresponding subscribing IoT device(s), e.g., IOT devices 116. The message transport client(s) 416 may then be used to communicate with the library message broker(s) 410 on the corresponding subscribing IoT device(s) and provide the three segments 412a, 412b, and 412c to the library message broker(s) 410. The library message broker(s) 410 may then assemble the three segments 412a, 412b, and 412c into the message 406 that is larger than the transport MTU, which is provided to corresponding one or more subscribing device app(s) 404 located on the one or more IoT devices, e.g., IoT devices 116. As previously noted, the corresponding message transport client(s) 416 and the corresponding library message broker(s) 410 may be part of the same library on one or more of the subscribing IoT devices and/or may be part of the corresponding subscribing device app(s) 404 on one or more IoT devices.

Alternatively, in configurations, the message transport broker may provide the three message segments to an edge machine learning (ML) message broker service 520 located within the cloud, e.g., the MQTT message service 106 of a service provider network 100. The edge ML message broker service 520 may then assemble the three segments into the message 506 that is larger than the transport MTU and provide the message 506 to a subscribing cloud app 522 that is located within the cloud, e.g., the service provider network 100.

Accordingly, the techniques and architecture described herein provide a method for segmenting large MQTT messages that exceed a maximum transport unit (MTU) for MQTT messages into smaller segments and then reassembling the segments into the original MQTT message. More particularly, the techniques and architecture provide two new fields within an existing MQTT message. In configurations, the two new fields may include a universally unique identifier (UUID) and a segment number. These two new fields enable segmentation of arbitrarily large messages at a publisher side of the MQTT message and reassembly of the segments of the large messages at the subscriber side so that the message size limitation may be overcome. This can allow for larger MQTT messages to be transmitted without the increased cost of larger maximum transport units. Additionally, latency may be improved since large messages that exceed the MTU will not be dropped.

FIG. 7 is a system and network diagram that shows one illustrative operating environment 700 for the configurations disclosed herein that includes a service provider network 100 that can be configured to perform the techniques disclosed herein and which may be accessed by a computing device 702. The service provider network 100 can provide computing resources, like virtual machine (VM) or instances (VM instances herein) and storage, on a permanent or an as-needed basis. Among other types of functionality, the computing resources provided by the service provider network 100 may be utilized to implement the various services described above such as, for example, the MQTT message service 106.

Each type of computing resource provided by the service provider network 100 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The service provider network 100 can also be configured to provide other types of computing resources not mentioned specifically herein.

The computing resources provided by the service provider network 100 may be enabled in one embodiment by one or more data centers 704A-704N (which might be referred to herein singularly as "a data center 704" or in the plural as "the data centers 704"). The data centers 704 are facilities utilized to house and operate computer systems and associated components. The data centers 704 typically include redundant and backup power, communications, cooling, and security systems. The data centers 704 can also be located in geographically disparate locations. One illustrative embodiment for a data center 704 that can be utilized to implement the technologies disclosed herein will be described below with regard to FIG. 7.

The data centers 704 may be configured in different arrangements depending on the service provider network 100. For example, one or more data centers 704 may be included in or otherwise make-up an availability zone. Further, one or more availability zones may make-up or be included in a region. Thus, the service provider network 100 may comprise one or more availability zones, one or more regions, and so forth. The regions may be based on geographic areas, such as being located within a predetermined geographic perimeter.

Users of the service provider network 100 may access the computing resources provided by the service provider network 100 over any wired and/or wireless network(s) 722, which can be a wide area communication network ("WAN"), such as the Internet, an intranet or an Internet service provider ("ISP") network or a combination of such networks. For example, and without limitation, a computing device, e.g., computing device 702, operated by a user of the service provider network 100 may be utilized to access the service provider network 100 by way of the network(s) 722. It should be appreciated that a local-area network ("LAN"), the Internet, or any other networking topology known in the art that connects the data centers 704 to remote customers and other users can be utilized. It should also be appreciated that combinations of such networks can also be utilized.

Each of the data centers 704 may include computing devices that include software, such as applications that receive and transmit data 708. For instance, the computing devices included in the data centers 704 may include software components which transmit, retrieve, receive, or otherwise provide or obtain the data 708 from a data store 710. For example, the data centers 704 may include or store the data store 710, which may include the data 708.

Figure 8:
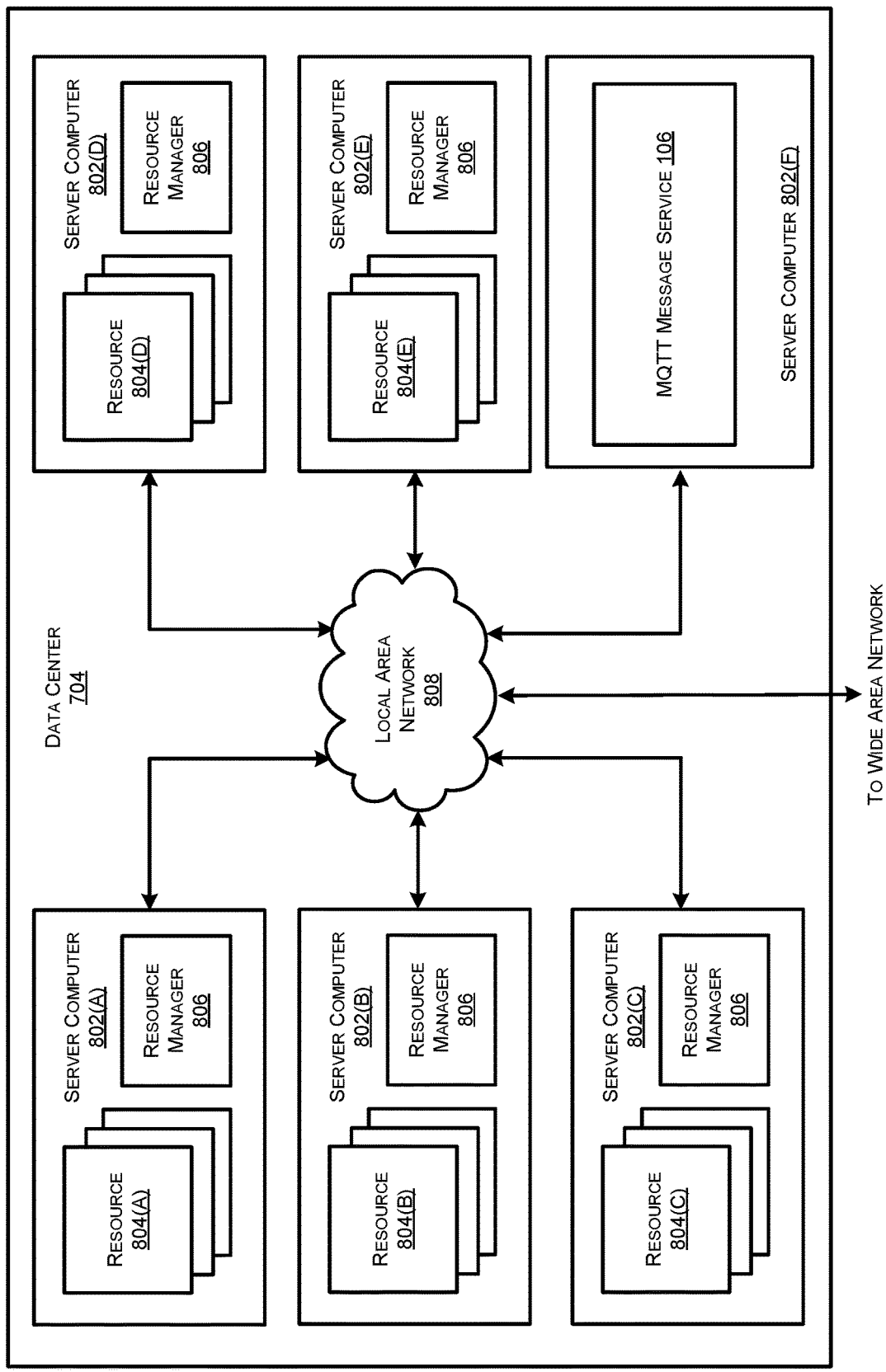
FIG. 8 is a computing system diagram illustrating a configuration for a data center that can be utilized to implement aspects of the technologies disclosed herein.

FIG. 8 is a computing system diagram that illustrates one configuration for a data center 704 that implements aspects of the technologies disclosed herein. The example data center 704 shown in FIG. 8 includes several server computers 802A-802F (which might be referred to herein singularly as "a server computer 802" or in the plural as "the server computers 802") for providing computing resources 804A-804E.

The server computers 802 can be standard tower, rack-mount, or blade server computers configured appropriately for providing the computing resources described herein (illustrated in FIG. 8 as the computing resources 804A-804E). As mentioned above, the computing resources provided by the service provider network 100 can be data processing resources such as VM instances or hardware computing systems, database clusters, computing clusters, storage clusters, data storage resources, database resources, networking resources, and others. Some of the server computers 802 can also be configured to execute a resource manager 806 capable of instantiating and/or managing the computing resources. In the case of VM instances, for example, the resource manager 806 can be a hypervisor or another type of program configured to enable the execution of multiple VM instances on a single server computer 802. Server computers 802 in the data center 704 can also be configured to provide network services and other types of services, some of which are described in detail below with regard to FIG. 8.

The data center 804 shown in FIG. 8 also includes a server computer 802F that can execute some or all of the software components described above. For example, and without limitation, the server computer 802F can be configured to execute components of the service provider network 100, including the MQTT message service 106, and/or the other software components described above. The server computer 802F can also be configured to execute other components and/or to store data for providing some or all of the functionality described herein. In this regard, it should be appreciated that the services illustrated in FIG. 8 as executing on the server computer 802F can execute on many other physical or virtual servers in the data centers 704 in various embodiments.

In the example data center 704 shown in FIG. 8, an appropriate local area network 808 is also utilized to interconnect the server computers 802A-802F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 704A-704N, between each of the server computers 802A-802F in each data center 704, and, potentially, between computing resources in each of the server computers 802. It should be appreciated that the configuration of the data center 704 described with reference to FIG. 8 is merely illustrative and that other implementations can be utilized.

Figure 9:
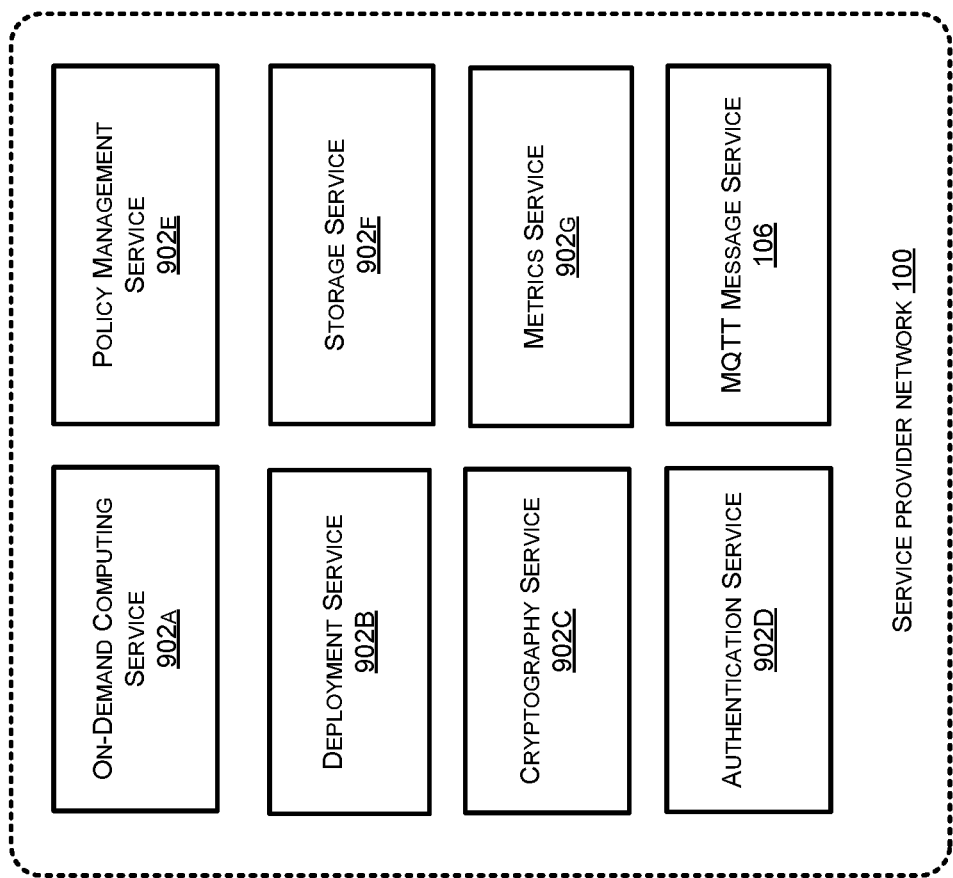
FIG. 9 is a network services diagram that shows aspects of several services that can be provided by and utilized within a system, or a larger system of which the system is a part, which is configured to implement the various technologies disclosed herein.

FIG. 9 is a system and network diagram that shows aspects of several network services that can be provided by and utilized within a service provider network 100 in one embodiment disclosed herein. In particular, and as discussed above, the service provider network 100 can provide a variety of network services to users within the service provider network 100, as well as customers, including, but not limited to, the MQTT message service 106. The service provider network 100 can also provide other types of services including, but not limited to, an on-demand computing service 902A (e.g., computing services 104), a deployment service 902B, a cryptography service 902C, a storage service 902D (e.g., storage services 102), an authentication service 902E, and/or a policy management service 902G, some of which are described in greater detail below. Additionally, the service provider network 100 can also provide other services, some of which are also described in greater detail below.

It should be appreciated that customers of the service provider network 100 can include organizations or individuals that utilize some or all of the services provided by the service provider network 100. As described herein, a customer or other user can communicate with the service provider network 100 through a network, such as the network 722 shown in FIG. 7. Communications from a user computing device, such as the client device 114 shown in FIG. 1, to the service provider network 100 can cause the services provided by the service provider network 100 to operate in accordance with the described configurations or variations thereof.

It is noted that not all embodiments described include the services described with reference to FIG. 9 and that additional services can be provided in addition to or as an alternative to services explicitly described. Each of the services shown in FIG. 9 can also expose network services interfaces that enable a caller to submit appropriately configured API calls to the various services through web service requests. In addition, each of the services can include service interfaces that enable the services to access each other (e.g., to enable a virtual computer system provided by the on-demand computing service 902A to store data in or retrieve data from a storage service). Additional details regarding some of the services shown in FIG. 9 will now be provided.

As discussed above, the on-demand computing service 902A (can be a collection of computing resources configured to instantiate VM instances and to provide other types of computing resources on demand. For example, a customer or other user of the service provider network 100 can interact with the on-demand computing service 902A (via appropriately configured and authenticated network services API calls) to provision and operate VM instances that are instantiated on physical computing devices hosted and operated by the service provider network 100.

The VM instances can be used for various purposes, such as to operate as servers supporting a web site, to operate business applications or, generally, to serve as computing resources for the customer. Other applications for the VM instances can be to support database applications such as those described herein, electronic commerce applications, business applications and/or other applications. Although the on-demand computing service 902A is shown in FIG. 9, any other computer system or computer system service can be utilized in the service provider network 100, such as a computer system or computer system service that does not employ virtualization and instead provisions computing resources on dedicated or shared computers/servers and/or other physical devices.

The service provider network 100 can also include a cryptography service 902C. The cryptography service 902C can utilize storage service 902F of the service provider network 100 to store encryption keys in encrypted form, whereby the keys are usable to decrypt customer keys accessible only to particular devices of the cryptography service 902C. The cryptography service 902C can also provide other types of functionality not specifically mentioned herein.

As illustrated in FIG. 9, the service provider network 100, in various embodiments, also includes an authentication service 902D and a policy management service 902E. The authentication service 902D, in one example, is a computer system (i.e., collection of computing resources) configured to perform operations involved in authentication of users. For instance, one of the services 902 shown in FIG. 9 can provide information from a user to the authentication service 902D to receive information in return that indicates whether or not the requests submitted by the user are authentic.

The policy management service 902E, in one example, is a network service configured to manage policies on behalf of customers or internal users of the service provider network 100. The policy management service 902E can include an interface that enables customers to submit requests related to the management of policy. Such requests can, for instance, be requests to add, delete, change or otherwise modify policy for a customer, service, or system, or for other administrative actions, such as providing an inventory of existing policies and the like.

The service provider network 100 can additionally maintain other services 902 based, at least in part, on the needs of its customers. For instance, the service provider network 100 can maintain a deployment service 902B for deploying program code and/or a data warehouse service in some embodiments. Other services can include object-level archival data storage services, database services, and services that manage, monitor, interact with, or support other services. The service provider network 100 can also be configured with other services not specifically mentioned herein in other embodiments.

Figure 10:
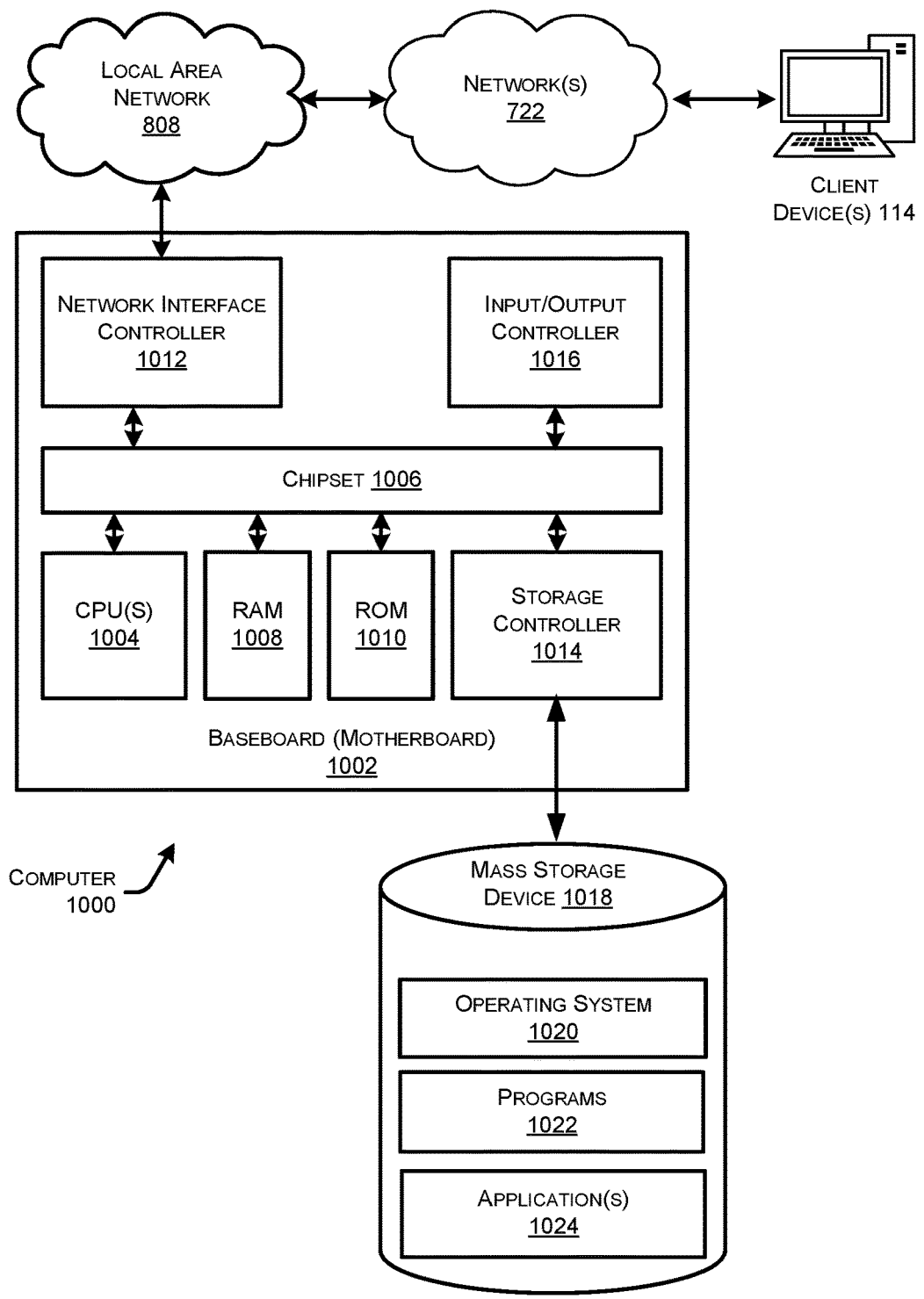
FIG. 10 is a computer architecture diagram showing an illustrative computer hardware architecture for implementing a computing device that can be utilized to implement aspects of the various technologies presented herein.

FIG. 10 shows an example computer architecture for a computer 1000 capable of executing program components for implementing the functionality described above. The computer architecture shown in FIG. 10 illustrates a server computer, workstation, desktop computer, laptop, tablet, network appliance, e-reader, smartphone, or other computing device, and can be utilized to execute any of the software components presented herein.

The computer 1000 includes a baseboard 1002, or "motherboard," which is a printed circuit board to which a multitude of components or devices can be connected by way of a system bus or other electrical communication paths. In one illustrative configuration, one or more central processing units ("CPUs") 1004 operate in conjunction with a chipset 1006. The CPUs 1004 can be standard programmable processors that perform arithmetic and logical operations necessary for the operation of the computer 1000.

The CPUs 1004 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1006 provides an interface between the CPUs 1004 and the remainder of the components and devices on the baseboard 1002. The chipset 1006 can provide an interface to a RAM 1008, used as the main memory in the computer 1000. The chipset 1006 can further provide an interface to a computer-readable storage medium such as a read-only memory ("ROM") 1010 or non-volatile RAM ("NVRAM") for storing basic routines that help to startup the computer 1000 and to transfer information between the various components and devices. The ROM 1010 or NVRAM can also store other software components necessary for the operation of the computer 1000 in accordance with the configurations described herein.

The computer 1000 can operate in a networked environment using logical connections to remote computing devices and computer systems through a network, such as the local area network 808. The chipset 1006 can include functionality for providing network connectivity through a Network Interface Controller (NIC) 1012, such as a gigabit Ethernet adapter. The NIC 1012 is capable of connecting the computer 1000 to other computing devices over the local area network 808 (or network(s) 722). It should be appreciated that multiple NICs 1012 can be present in the computer 1000, connecting the computer to other types of networks and remote computer systems.

The computer 1000 can be connected to a mass storage device 1018 that provides non-volatile storage for the computer. The mass storage device 1018 can store an operating system 1020, programs 1022 (e.g., agents, etc.), data, and/or applications(s) 1024, which have been described in greater detail herein. The mass storage device 1018 can be connected to the computer 1000 through a storage controller 1014 connected to the chipset 1006. The mass storage device 1018 can consist of one or more physical storage units. The storage controller 1014 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1000 can store data on the mass storage device 1018 by transforming the physical state of the physical storage units to reflect the information being stored. The specific transformation of physical states can depend on various factors, in different embodiments of this description. Examples of such factors can include, but are not limited to, the technology used to implement the physical storage units, whether the mass storage device 1018 is characterized as primary or secondary storage, and the like.

For example, the computer 1000 can store information to the mass storage device 1018 by issuing instructions through the storage controller 1014 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1000 can further read information from the mass storage device 1018 by detecting the physical states or characteristics of one or more particular locations within the physical storage units.

In addition to the mass storage device 1018 described above, the computer 1000 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1000. In some examples, the operations performed by the service provider network 100, and or any components included therein, may be supported by one or more devices similar to computer 1000. Stated otherwise, some or all of the operations performed by the service provider network 100, and or any components included therein, may be performed by one or more computers 1000 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 1018 can store an operating system 1020 utilized to control the operation of the computer 1000. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The mass storage device 1018 can store other system or application programs and data utilized by the computer 1000.

In one embodiment, the mass storage device 1018 or other computer-readable storage media is encoded with computer-executable instructions which, when loaded into the computer 1000, transform the computer from a general-purpose computing system into a special-purpose computer capable of implementing the embodiments described herein. These computer-executable instructions transform the computer 1000 by specifying how the CPUs 1004 transition between states, as described above. According to one embodiment, the computer 1000 has access to computer-readable storage media storing computer-executable instructions which, when executed by the computer 1000, perform the various processes described above with regard to FIGS. 1-6. The computer 1000 can also include computer-readable storage media having instructions stored thereupon for performing any of the other computer-implemented operations described herein.

The computer 1000 can also include one or more input/output controllers 1016 for receiving and processing input from a number of input devices, such as a keyboard, a mouse, a touchpad, a touch screen, an electronic stylus, or other type of input device. Similarly, an input/output controller 1016 can provide output to a display, such as a computer monitor, a flat-panel display, a digital projector, a printer, or other type of output device. It will be appreciated that the computer 1000 might not include all of the components shown in FIG. 10, can include other components that are not explicitly shown in FIG. 10, or might utilize an architecture completely different than that shown in FIG. 10.

The computer 1000 may transmit, receive, retrieve, or otherwise provide and/or obtain data and/or results to and/or from the service provider network 100. The computer 1000 may store the data on the operating system 1020, and/or the programs 1022 that are stored in the mass storage device 1018 to update or otherwise modify the operating system 1020 and/or the programs 1022.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A method comprising:

receiving, at a message queuing telemetry transport (MQTT) broker of a MQTT service of a service provider network from a message transport client on a first Internet of Things (IoT) device, a first segment of a MQTT message, wherein the first segment of the MQTT message comprises a universally unique identifier (UUID) field comprising (i) a length field, (ii) a client identifier field, and (iii) a message ID field, and wherein the first segment of the MQTT message further comprises a segment number field comprising (i) a total field indicating a total number of segments of the MQTT message and (ii) an index indicating a corresponding number of the first segment out of the total number of segments of the MQTT message;

forwarding, by the MQTT broker, the first segment to one of (i) a message transport client and a library message broker on a second IoT device or (ii) an edge machine learning (ML) message broker service of the service provider network;

upon receipt of the first segment of the MQTT message, activating, by the one of (i) the message transport client and the library message broker on the second IoT device or (ii) the edge ML message broker service, a timer associated with a linked list of the first and second segments to monitor a maximum waiting time in which the first and second segments are to be received;

receiving, at the MQTT broker of the service provider network from the message transport client on the first IoT device, a second segment of the MQTT message, wherein the second segment of the MQTT message comprises the universally unique identifier UUID field comprising (i) the length field, (ii) the client identifier field, and (iii) the message ID field, and wherein the second segment of the MQTT message further comprises the segment number field comprising (i) the total field indicating a total number of segments of the MQTT message and (ii) the index indicating a corresponding number of the second segment out of the total number of segments of the MQTT message;

forwarding, by the MQTT broker, the second segment to the one of (i) the message transport client and the library message broker on the second IoT device or (ii) the edge ML message broker service;

based on the segment number field, determining, by the one of (i) the message transport client and the library message broker on the second IoT device or (ii) the edge ML message broker service, whether all segments of the MQTT message have been received; and based on determining that all of the segments of the MQTT message have been received, combining, by the one of (i) the message transport client and the library message broker on the second IoT device or (ii) the edge ML message broker service, at least the first segment of the MQTT message and the second segment of the MQTT message to form the MQTT message, wherein a size of the MQTT message exceeds a maximum transport unit (MTU) of at least one of (i) the service provider network, (ii) the first IoT device, or (iii) the second IoT device.

2. The method of claim 1, further comprising:

upon receipt of the first segment of the MQTT message at the one of (i) the message transport client and the library message broker on the second IoT device or (ii) the edge ML message broker service, storing the first segment of the MQTT message in a first buffer; and upon receipt of the second segment of the MQTT message at the one of (i) the message transport client and the library message broker on the second IoT device or (ii) the edge ML message broker service, storing the second segment of the MQTT message in a second buffer.

3. The method of claim 2, wherein the first buffer and the second buffer are pre-reserved as a single buffer having a second size equal to the size of the MQTT message.

4. The method of claim 2, further comprising:

copying, by the one of (i) the message transport client and the library message broker on the second IoT device or (ii) the edge ML message broker service, the first segment of the MQTT message from the first buffer and the second segment of the MQTT message from the second buffer into a single buffer having a second size equal to the size of the MQTT message.

5. The method of claim 1, wherein a bit of a last byte in a remaining length field of the first segment of the MQTT message and the second segment of the MQTT message indicates a presence of the UUID field and the segment number field.

6. One or more non-transitory computer-readable media storing computer-executable instructions that, when executed, cause one or more processors to perform operations comprising:

receiving, at a message queuing telemetry transport (MQTT) broker of a MQTT service of a service provider network from a message transport client on a first Internet of Things (IoT) device, a first segment of a MQTT message, wherein the first segment of the MQTT message comprises a universally unique identifier (UUID) field comprising (i) a length field, (ii) a client identifier field, and (iii) a message ID field, and wherein the first segment of the MQTT message further comprises a segment number field comprising (i) a total field indicating a total number of segments of the MQTT message and (ii) an index indicating a corresponding number of the first segment out of the total number of segments of the MQTT message;

forwarding, by the MQTT broker, the first segment to one of (i) a message transport client and a library message broker on a second IoT device or (ii) an edge machine learning (ML) message broker service of the service provider network;

upon receipt of the first segment of the MQTT message, activating, by the one of (i) the message transport client and the library message broker on the second IoT device or (ii) the edge ML message broker service, a timer associated with a linked list of the first and second segments to monitor a maximum waiting period during which the first and second segments are to be received;

receiving, at the MQTT broker of the service provider network from the message transport client on the first IoT device, a second segment of the MQTT message, wherein the second segment of the MQTT message comprises the universally unique identifier UUID field comprising (i) the length field, (ii) the client identifier field, and (iii) the message ID field, and wherein the second segment of the MQTT message further comprises the segment number field comprising (i) the total field indicating a total number of segments of the MQTT message and (ii) the index indicating a corresponding number of the second segment out of the total number of segments of the MQTT message;

forwarding, by the MQTT broker, the second segment to the one of (i) the message transport client and the library message broker on the second IoT device or (ii) the edge ML message broker service;

based on the segment number field, determining, by the one of (i) the message transport client and the library message broker on the second IoT device or (ii) the edge ML message broker service, whether all segments of the MQTT message have been received; and based on determining that all of the segments of the MQTT message have been received, combining, by the one of (i) the message transport client and the library message broker on the second IoT device or (ii) the edge ML message broker service, at least the first segment of the MQTT message and the second segment of the MQTT message to form the MQTT message, wherein a size of the MQTT message exceeds a maximum transport unit (MTU) of at least one of (i) the service provider network, (ii) the first IoT device, or (iii) the second IoT device.

7. The one or more non-transitory computer-readable media storing computer-executable instructions of claim 6, wherein the operations further comprise:

upon receipt of the first segment of the MQTT message at the one of (i) the message transport client and the library message broker on the second IoT device or (ii) the edge ML message broker service, storing the first segment of the MQTT message in a first buffer; and upon receipt of the second segment of the MQTT message at the one of (i) the message transport client and the library message broker on the second IoT device or (ii) the edge ML message broker service, storing the second segment of the MQTT message in a second buffer.

8. The one or more non-transitory computer-readable media storing computer-executable instructions of claim 7, wherein the first buffer and the second buffer are pre-reserved as a single buffer having a second size equal to the size of the MQTT message.

9. The one or more non-transitory computer-readable media storing computer-executable instructions of claim 7, further comprising:

copying, by the one of (i) the message transport client and the library message broker on the second IoT device or (ii) the edge ML message broker service, the first segment of the MQTT message from the first buffer and the second segment of the MQTT message from the second buffer into a single buffer having a second size equal to the size of the MQTT message.

10. The one or more non-transitory computer-readable media storing computer-executable instructions of claim 6, wherein a bit of a last byte in a remaining length field of the first segment of the MQTT message and the second segment of the MQTT message indicates a presence of the UUID field and the segment number field.

11. The one or more non-transitory computer-readable media storing computer-executable instructions of claim 6, wherein a most significant bit of a last byte in a remaining length field of the first segment of the MQTT message and the second segment of the MQTT message indicates a presence of the UUID field and the segment number field.

12. The one or more non-transitory computer-readable media storing computer-executable instructions of claim 6, wherein the operations further comprise:

upon expiration of the maximum waiting period, performing the determining, by the one of (i) the message transport client and the library message broker on the second IoT device or (ii) the edge ML message broker service, if all segments of the MQTT message have been received; and based at least in part on determining all segments of the MQTT message have not been received, discarding, by the one of (i) the message transport client and the library message broker on the second IoT device or (ii) the edge ML message broker service, any received segments of the MQTT message.

13. A system comprising:

one or more processors; and one or more computer-readable media storing computer-executable instructions that, when executed, cause one or more processors to perform operations comprising:

receiving, at a message queuing telemetry transport (MQTT) broker of a MQTT service of a service provider network from a message transport client on a first Internet of Things (IoT) device, a first segment of a MQTT message, wherein the first segment of the MQTT message comprises a universally unique identifier (UUID) field comprising (i) a length field, (ii) a client identifier field, and (iii) a message ID field, and wherein the first segment of the MQTT message further comprises a segment number field comprising (i) a total field indicating a total number of segments of the MQTT message and (ii) an index indicating a corresponding number of the first segment out of the total number of segments of the MQTT message;

forwarding, by the MQTT broker, the first segment to one of (i) a message transport client and a library message broker on a second IoT device or (ii) an edge machine learning (ML) message broker service of the service provider network;

upon receipt of the first segment of the MQTT message, activating, by the one of (i) the message transport client and the library message broker on the second IoT device or (ii) the edge ML message broker service, a timer associated with a linked list of the first and second segments to monitor a maximum waiting period during which the first and second segments are to be received;

receiving, at the MQTT broker of the service provider network from the message transport client on the first IoT device, a second segment of the MQTT message, wherein the second segment of the MQTT message comprises the universally unique identifier UUID field comprising (i) the length field, (ii) the client identifier field, and (iii) the message ID field, and wherein the second segment of the MQTT message further comprises the segment number field comprising (i) the total field indicating a total number of segments of the MQTT message and (ii) the index indicating a corresponding number of the second segment out of the total number of segments of the MQTT message;

forwarding, by the MQTT broker, the second segment to the one of (i) the message transport client and the library message broker on the second IoT device or (ii) the edge ML message broker service;

based on the segment number field, determining, by the one of (i) the message transport client and the library message broker on the second IoT device or (ii) the edge ML message broker service, whether all segments of the MQTT message have been received; and based on determining that all of the segments of the MQTT message have been received, combining, by the one of (i) the message transport client and the library message broker on the second IoT device or (ii) the edge ML message broker service, at least the first segment of the MQTT message and the second segment of the MQTT message to form the MQTT message, wherein a size of the MQTT message exceeds a maximum transport unit (MTU) of at least one of (i) the service provider network, (ii) the first IoT device, or (iii) the second IoT device.

14. The system of claim 13, wherein the operations further comprise:

upon receipt of the first segment of the MQTT message at the one of (i) the message transport client and the library message broker on the second IoT device or (ii) the edge ML message broker service, storing the first segment of the MQTT message in a first buffer; and upon receipt of the second segment of the MQTT message at the one of (i) the message transport client and the library message broker on the second IoT device or (ii) the edge ML message broker service, storing the second segment of the MQTT message in a second buffer.

15. The system of claim 14, wherein the first buffer and the second buffer are pre-reserved as a single buffer having a second size equal to the size of the MQTT message.

16. The system of claim 14, wherein the operations further comprise:

copying, by the one of (i) the message transport client and the library message broker on the second IoT device or (ii) the edge ML message broker service, the first segment of the MQTT message from the first buffer and the second segment of the MQTT message from the second buffer into a single buffer having a second size equal to the size of the MQTT message.

17. The system of claim 13, wherein a bit of a last byte in a remaining length field of the first segment of the MQTT message and the second segment of the MQTT message indicates a presence of the UUID field and the segment number field.

18. The system of claim 13, wherein a most significant bit of a last byte in a remaining length field of the first segment of the MQTT message and the second segment of the MQTT message indicates a presence of the UUID field and the segment number field.

19. The system of claim 13, wherein the operations further comprise:

upon expiration of the maximum waiting period, performing the determining, by the one of (i) the message transport client and the library message broker on the second IoT device or (ii) the edge ML message broker service, if all segments of the MQTT message have been received; and based at least in part on determining all segments of the MQTT message have not been received, discarding, by the one of (i) the message transport client and the library message broker on the second IoT device or (ii) the edge ML message broker service, any received segments of the MQTT message.

* * * * *